(12) United States Patent
Hagihara et al.

(10) Patent No.: US 7,204,792 B2
(45) Date of Patent: Apr. 17, 2007

(54) APPARATUS FOR AUTOMATICALLY CHANGING A ROBOT TOOL TIP MEMBER

(75) Inventors: Masahiro Hagihara, Yamanashi (JP);
Masaaki Saito, Ina (JP); Takeshi Tsumura, Yamanashi (JP); Toshihiko Inoue, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/472,270

(22) Filed: Jun. 22, 2006

(65) Prior Publication Data

US 2006/0240961 A1    Oct. 26, 2006

Related U.S. Application Data

(62) Division of application No. 10/784,158, filed on Feb. 24, 2004.

(30) Foreign Application Priority Data

Feb. 25, 2003    (JP)    ............... 2003-047995

(51) Int. Cl.
*B23Q 3/155* (2006.01)
(52) U.S. Cl. ............... 483/7; 483/13; 483/16; 483/66
(58) Field of Classification Search ............... 483/7, 483/13, 16, 66, 1, 69, 901, 67; 901/41
See application file for complete search history.

(56) References Cited

U.S. PATENT DOCUMENTS

| 4,596,066 | A | * | 6/1986 | Inoue ............... 483/4 |
|---|---|---|---|---|
| 4,733,050 | A | | 3/1988 | Grafius |
| 4,773,815 | A | * | 9/1988 | Lemelson ............... 483/901 |
| 4,845,834 | A | * | 7/1989 | Watson ............... 483/31 |
| 4,883,939 | A | | 11/1989 | Sagi |
| 4,897,014 | A | * | 1/1990 | Tietze ............... 483/901 |
| 4,993,139 | A | * | 2/1991 | Burry et al. ............... 483/7 |
| 5,017,084 | A | * | 5/1991 | Lemelson ............... 483/1 |
| 5,134,767 | A | * | 8/1992 | Yasuda ............... 483/7 |
| 5,339,597 | A | * | 8/1994 | Naka et al. ............... 483/69 |
| 5,879,277 | A | * | 3/1999 | Dettman et al. ............... 483/13 |
| 6,716,146 | B2 | * | 4/2004 | Kato ............... 483/58 |
| 6,846,276 | B2 | * | 1/2005 | Yasumatsuya et al. ............... 483/1 |

FOREIGN PATENT DOCUMENTS

| JP | 06269946 | 9/1994 |
|---|---|---|
| JP | 10-43879 | 2/1998 |
| WO | 2004/035251 | 4/2004 |

* cited by examiner

*Primary Examiner*—Dana Ross
(74) *Attorney, Agent, or Firm*—Staas & Halsey LLP

(57) ABSTRACT

An apparatus for automatically changing a tool tip member for a robot includes a tip member changing jig disposed in an operational area of the robot. The tip member changing jig includes a base member, a rotating member supported by the base member so as to be rotatable about a rotation axis, and tip member holding means disposed at positions that are offset from the rotation axis of the rotating member. The tip member holding means holds the tool tip member so that a central axis of relative rotation, for threadedly mounting or demounting the tool tip member on or from the tool body, extends substantially parallel to the rotation axis of the rotating member and so that rotation of the tool tip member, with respect to the rotating member, is locked.

7 Claims, 9 Drawing Sheets

APPARATUS FOR AUTOMATICALLY CHANGING A ROBOT TOOL TIP MEMBER

CROSS-REFERENCE TO RELATED APPLICATIONS

This application is as divisional application of U.S. application Ser. No. 10/784,158, filed on Feb. 24, 2004, now pending, and also claims priority to Japanese Application No. 2003-047995, filed Feb. 25, 2003, the disclosure of which is incorporated herein by reference.

BACKGROUND OF THE INVENTION

1. Field of the Invention

The present invention relates to an apparatus for automatically changing a robot tool tip member, which operates in the condition that the tool tip member is threadedly mounted on a tool body which is, in turn, mounted on a robot arm. For example, the present invention is applied to an apparatus for automatically changing a tool tip member mounted on a distal end of a tool body for arc welding or laser machining.

2. Description of the Related Art

When an industrial robot (hereinafter simply referred to as a "robot") is used for arc welding or laser machining, a tool tip member is mounted on a distal end of a tool body. Typically, the tool tip member is mounted by threadedly engaging it with the tool body.

As the tool tip member is used repeatedly, it wears and must, eventually, be changed. Therefore, in order to increase an efficiency of labor savings achieved by robots, various techniques for automatically changing tool tip members have been developed and proposed.

For example, Japanese Unexamined Patent Publication (Kokai) No. 10-43879 discloses a method for automatically demounting or mounting a nozzle tip (a tool tip member used for laser machining) from or on a distal end of a laser machining head (a tool body) in a three-dimensional laser machining apparatus using a robot. In this method, the nozzle tip is held by a nozzle tip holding device provided with a power chuck, and the nozzle tip is demounted or mounted by rotating the machining head, on which the nozzle tip is mounted (or on which the nozzle tip is to be mounted), about a center axis of the nozzle tip with the help of five-axis control function of the laser machining apparatus. Further, among motors that are used in the laser machining apparatus for driving a wrist portion of the robot, motors for controlling two-axes of the wrist are contained in the rear of the wrist portion, and power transmission means such as drive shafts are used for securing an operation range of the wrist.

However, when a dedicated automatic changing apparatus for demounting or mounting a tool tip member is used in the method described above, the automatic changing apparatus requires a driving power source to drive actuators used for fastening the tool tip member, resulting in a problem that running costs are increased.

Further, when the robot of the laser machining apparatus is used for such purpose, the tool tip member must be rotated for threadedly mounting or demounting the tool tip member on or from the tool body, so that the robot is required to rotate continuously about the central axis of the rotational operation.

However, in a typical robot system for performing arc welding or laser machining, as the robot itself has various lines (wirings, tubings and pipings) attached thereto, such as a motor control line, an energy supply line for a tool body, a sensor signal line, an assist gas supply line and the like, the operation range of the wrist axis of the robot is restricted by these lines and, therefore, the continuous rotation required for threadedly mounting or demounting the tool tip member on or from the tool body is not permitted in most cases.

For example, regarding the line for supplying assist gas to the machining head, it is apparent that the line arrangement wherein the lines are attached to the outside of the apparatus is incompatible with the requirement of continuous rotation described above. Further, as can be seen in the example of the Japanese Unexamined Patent Publication (Kokai) No. 10-43879 mentioned above, a dedicated mechanism for securing the operation range of the wrist portion has been required.

SUMMARY OF THE INVENTION

Therefore, in order to solve the problems of the prior arts described above, it is an object of the invention to provide an apparatus for automatically changing a robot tool tip member, which does not require an additional driving power source for changing a tool tip member, which apparatus has a simple structure so that a setup of the apparatus requires fewer operation steps, and which apparatus is suitably used in a typical robot system for performing arc welding or laser machining.

According to the present invention, there is provided an apparatus for automatically changing a tool tip member for a robot that operates in the condition that the tool tip member is threadedly mounted on a tool body mounted on a robot arm, which includes a tip member changing jig disposed in an operational area of the robot, and a controller for controlling operation of the robot. The tip member changing jig includes a base member, a rotating member rotatably supported by the base member about a rotation axis, and tip member holding means for holding the tip member and disposed at a position that is offset from the rotation axis of the rotating member, and the tip member holding means is adapted to hold the tool tip member so that a central axis of relative rotation for threadedly mounting the tool tip member on the tool body extends substantially parallel to the rotation axis and rotation of the tool tip member with respect to the rotating member is locked.

In the apparatus described above, the controller can control the operation of the robot arm of said robot to move the tool body around the rotation axis while keeping the tool body in contact with the tool tip member held by the tip member holding means, thereby to rotate a rotating member about the rotation axis while bringing about the relative rotation between the tool body and the tool tip member so as to demount or mount the tool tip member from or on the tool body.

In the apparatus described above, the rotating member may be provided with means for detecting a rotational phase. Preferably, the tip member holding means has a rotation locking member for locking the relative rotation of the tool tip member with respect to the tip member holding means and the rotation locking member is supported on the rotating member via elastic element. The rotation locking member is supported on the rotating member so as to allow the rotation locking member to rotate about its axis when a torque larger than a predetermined value is exerted on the rotation locking member in the rotation direction.

Preferably, the rotation locking member includes a cylindrical portion formed with a receiving hole for receiving the tool tip member, so that the tool tip member is demounted or mounted from or on the tool body while the tool tip member is being inserted into the receiving hole. More preferably, a cylindrical outer tool tip member is further attached to the tool body so as to encircle the periphery of the tool tip member with a gap, and an outer diameter of the cylindrical portion of the rotation locking member is smaller than an inner diameter of the outer tool tip member, so that the inner tool tip member disposed inside said outer tool tip member can be changed while the outer tool tip member being mounted on the tool body.

The rotating member may be provided with tool cleaning means for cleaning both or either one of the inner tool tip member and the outer tool tip member.

In this case, it is preferable that the tool cleaning means includes a cylindrical element and the controller controls the operation of the robot arm to move the tool body around the rotation axis with the cylindrical element inserted between the inner tool tip member and the outer tool tip member, thereby to bring about relative rotation between the cylindrical element of the tool cleaning means and the inner and outer tool tip members so as to clean both or either one of the inner tool tip member and the outer tool tip member.

For example, said robot may be an arc welding robot, said tool body may be an arc torch provided with a nozzle as said outer tool tip member, said inner tool tip member may be a contact tip, and said tool cleaning means may be nozzle cleaning means.

Thus, according to the present invention, as the tool tip member changing jig is utilized, it is not necessary to provide another driving power sources besides the robot mechanism, so that additional running costs are not required. Further, as all that is required, for addition of the tool tip member changing function, is a provision of a tool tip member changing jig and cumbersome wiring/tubing works are not needed, the addition of the function requires minimum setup steps. Moreover, if the tool tip member changing jig is used when the tool tip member is changed, the wrist axis of the robot does not need to rotate continuously. Therefore, the present invention can also be applied to a case in which lines for assist gas and the like are connected to the tool body. Thus, according to the present invention, the operation for changing the tool tip member can be implemented easily by using a robot that is used in a typical robot system for arc welding and laser machining.

BRIEF DESCRIPTION OF THE DRAWINGS

The above and other objects, features and advantages of the present invention will be described below in conjunction with several embodiments of the present invention with reference to the accompanying drawings, in which:

FIGS. 9A and 9B are diagrams for illustrating a process for changing the tool tip member in the case that a nozzle is attached to a tool body in addition to the typical tool tip member, wherein FIG. 9A shows the demounting of the tool tip member when the tip member holding means for the demounting process shown in FIG. 5A is used, and FIG. 9B shows the mounting of the tool tip member when the tip member holding means for the mounting process shown in FIG. 6A is used.

DESCRIPTION OF THE PREFERRED EMBODIMENTS

Figure 1A:
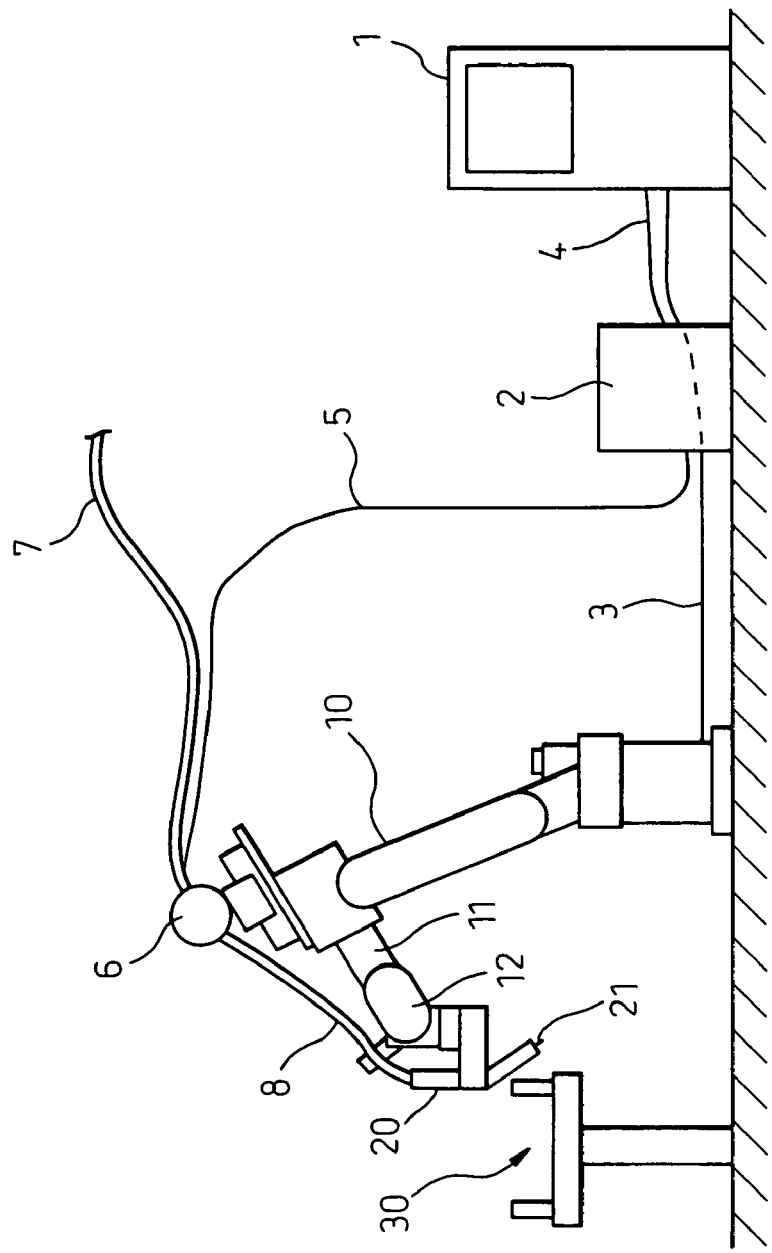
FIGS. 1A and 1B are a front view and a right side view, respectively, showing an entire configuration of an arc welding robot system according to the present invention.
Figure 1B:
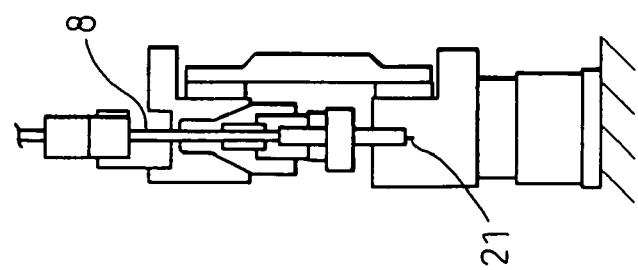

FIGS. 1A and 1B schematically show an entire configuration of an embodiment of a system to which the present invention is applied. As is apparent from the figures, this system utilizes an arc welding robot and includes a robot controller 1 for functioning as a control section of the system, a welding power source 2, a wire feeding device 6, a welding wire 7, a torch cable 8, a robot mechanism 10 having a robot arm, and a welding torch (or a tool body) 20. A robot control cable 3 connects between the robot controller 1 and the robot mechanism 10, and a welding power source control cable 4 connects between the robot controller 1 and the welding power source 2. It should be noted that FIG. 1A illustrates that the robot control cable 3 runs behind the welding power source 2.

The welding torch 20 is mounted on a wrist element 12 of the robot mechanism 10. The welding wire 7 is fed from a welding wire drum (not shown) to the welding torch 20 through the wire feeding device 6 placed on a top of a forearm 11 of the robot mechanism 10. Downstream from the wire feeding device 6, the welding wire 7 is arranged inside the torch cable 8 along with an assist gas supply line (not shown) and a welding power supply cable 5 extending from the welding power source 2 and reaches the welding torch 20.

The welding torch 20 constitutes a tool body in this embodiment, and a contact tip (it may be simply referred to as a "tip") 21 as a tool tip member is threadedly mounted on a forward end of the welding torch 20. As discussed below, other tool tip member such as a nozzle 22 encircling the periphery of the contact tip with a gap may be mounted on the welding torch 20. Further, in this embodiment, a tool tip member changing mechanism generally referred by reference numeral 30 is provided so that the cooperation between the robot mechanism 10 and the tool tip member changing mechanism 30 allows the contact tip 21 to be demounted or mounted from or on the welding torch 20. It should be noted that the arc welding robot in this embodiment has six degrees of freedom.

The motion axis drive in the robot mechanism 10 is provided by servo motors controlled by the robot controller 1 in a well-known manner, and each of the servo motors is associated with each of the motion axes of the robot mechanism 10. An operating program is stored in the robot controller 1 and, according to the operating program, the welding torch 20 mounted near the distal end of the wrist portion 12 moves to a target position and performs arc welding on a workpiece (not shown), such as a join, in an instructed orientation. The robot controller 1 controls the servo motors via the robot control cable 3 connecting the robot controller 1 to servo motors in a well-known manner.

The robot controller 1 also outputs a welding command to the welding power source 2, along with an operation command to each servo motor for each axis, to control a welding voltage and/or a welding current of the welding wire portion at the end of the welding torch 20 through the welding power source 2 in synchronization with the operation of the robot.

As described above, the welding torch 20 is mounted on the distal end of the wrist element 12 of the robot mechanism 10, and the contact tip (tool tip member) 21 is threadedly mounted on the distal end of the welding torch 20 (as described more specifically below). Then, according to an operation command from the robot controller 1, the welding wire 7 is fed to the welding torch 20 through the torch cable 8 via the wire feeding device 6.

On the other hand, the welding voltage and the welding current are supplied from the welding power source 2 to the contact tip 21 of the welding torch 20 through the welding power supply cable 5 contained in the torch cable 8. Then, the contact tip 21 supplies the welding voltage and the welding current to the welding wire 7 contacting therewith. To this end, the contact tip 21 is made of a highly conductive material (typically, copper).

Due to factors such as abrasion resulting from the contacting with the welding wire 7 and failure resulting from spatters caused by electric discharge, the contact tip 21 must be changed regularly (usually, a few times a day). Similar needs (to change the tool tip member mounted on the distal end of the tool body) may occur in other circumstances. In a laser machining robot, for example, a nozzle tip at the distal end of a machining head may have to be changed.

Figure 2A:
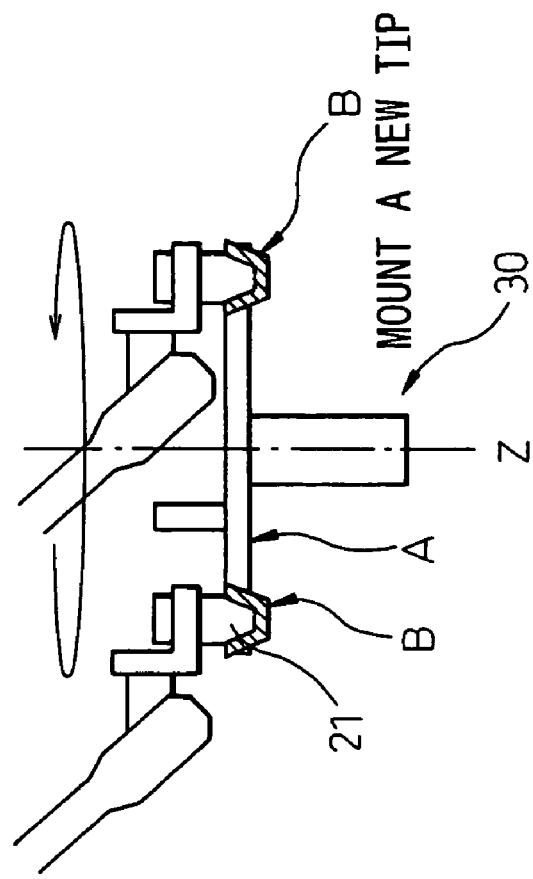
FIGS. 2A and 2B are diagrams for illustrating demounting and mounting processes, respectively, of a tool tip member.

With reference to FIGS. 2A–9B, a procedure for changing the tool tip member (the contact tip 21 in this case) by cooperation between the robot mechanism 10 and the tool tip member changing mechanism 30 will be described. FIGS. 2A and 2B are diagrams for illustrating demounting and mounting processes, respectively, of the tool tip member 21.

Firstly, when a command to change the tool tip member 21 is input to the robot controller 1, the robot mechanism 10 starts an operation for changing the tool tip member, according to the changing command from the robot controller 1. This changing command is input, for example, by an operator pushing a changing command button of an operator control panel (not shown) to send the input signal to the robot controller 1. The robot mechanism 10 cancels the changing command from the robot controller 1 after the process for changing the tool tip member 21 is completed.

Figure 2B:
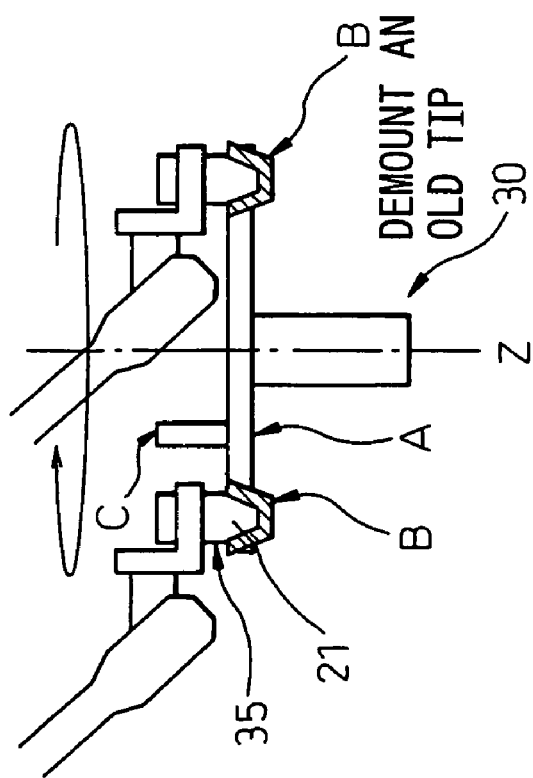

As shown in FIGS. 2A and 2B, the tool tip member changing mechanism 30 is provided with a tip member changing jig, and the tip member changing jig includes a rotating member A supported by a base member so as to be rotatable about a rotation axis Z, a plurality of tip member holding means (tip holders in this case) B disposed on the rotating member A so that they are apart from each other along a circle centered on the rotation axis, and a locating member C projecting upward from an upper surface of the rotation member A. The robot mechanism 10 is taught an initial position from which the tool tip member changing operation starts in advance, and the initial position is defined as a position apart from the rotation axis Z of the rotating member A by a predetermined distance and somewhat above the rotating member A. The "predetermined distance" is determined to correspond to the distance between a rotation center the rotation member A and the tip member holding means B.

When the robot mechanism 10 receives the tool tip member changing command, it starts an operation for changing the tool tip member (the contact tip in this case) 21 and moves to the initial position. Generally, robots must recognize a phase of rotation (or, an amount of rotation with regard to a reference position) in advance in order to allow the tip member holding means B to hold the tip member 21. If it is assured that a rotational phase before a changing operation is same as that at the time that a previous changing operation has been completed, it is not necessary to detect the rotation phase. However, if the operator, who sets a new tool tip member for replacement on the tip member changing jig, inadvertently rotates the rotating member A after the previous changing operation is completed, the rotation phase of the rotating member A will be changed. In order to address the latter case, a rotational phase detecting means for detecting a rotational phase of the rotating member A is required.

The locating member C shown in FIGS. 2A and 2B is an example of the rotational phase detecting means discussed above. For example, in order to locate the rotating member A (or return it to its home position), the tool tip member 21 of the robot mechanism 10 is firstly moved onto the circular orbit of the locating member C and then toward the rotating member A from above until the tool tip member 21 reaches below the top end of the locating member C. The rotating member A is then rotated about the rotation axis Z until the tool tip member 21 abuts on the locating member C, thereby to locate the rotating member A (return it to its home position).

It is desirable that the locating member C can escape in the rotation direction when the tool tip member 21 directly approaches it from above. Alternatively, in place of the locating member C, a rotational phase detecting means using a pulse coder for detecting a rotational position of the rotating member A may be provided. Further, the rotating member A may be provided with grooves for indexing and an indexing means configured to push a spring plunger against the grooves may be provided so that a rotational phase after the previous changing operation has been completed cannot be rotated inadvertently.

In order to prevent the welding wire 7 from interfering the operation of changing the tool tip member 21, before changing the tool tip member 21, the robot mechanism 10 sends a command to the wire feeding device 6 to draw the welding wire back so that the welding wire 7 is not left near the tool tip member 21. Further, if a bead formed at the distal end of the welding wire 7 when the welding is finished is larger than the internal diameter of the tool tip member 21 so that the welding wire cannot move back, it is desirable to cut the end portion of the welding wire 7 in advance by a wire cutter and the like.

Then, after the robot moves to a position directly above one of the empty tool tip member holding means B, based on the result of the locating, it descends by a predetermined distance so as to insert the tool tip member 21 into the tip member holding means B (in this case, a tip receiving hole of the tip holder) of the tip member changing jig. It should be noted that the descending distance is determined so that the tool tip member can be inserted properly into the tip receiving hole.

When the tool tip member 21 is inserted into the tool tip member holding means B, the tool tip member 21 is locked and cannot move in the tip member holding means B (the tip holder). In order to ensure the locking condition, for example, the tip member holding means B is provided with a friction element. The robot mechanism 10 operates with the tool tip member 21 locked within the tip member holding means B the robot arm, to move the tool body 20 in circle around the rotation axis Z in synchronization with the rotating member A. It is moved in circle around the rotation axis Z in a direction to threadedly demount the tool tip member 21 from the tool body 20, and the amount of the circular movement is previously determined to be larger by a proper amount than that necessary to threadedly mount the tool tip member 21 on the tool body 20.

At this time, as the tool tip member 21 locked within the tip member holding means B changes its orientation about the rotation axis Z while the tool body 20 does not substantially change its orientation about the rotation axis Z, the relative rotation between the tool body 20 and the tool tip member 21 occurs to achieve the demounting of the tool tip member 21.

When the tool tip member 21 is mounted on the tool body 20, the tool body 20 mounted on the distal end of the robot arm is firstly moved to the initial position. Then, again, based on the result of the locating described above, the tool body 20 moves to a position above the tool tip member holding means B in which the tool tip member 21 is held therein while it is locked by friction, and then descends by a predetermined appropriate distance. Then, the tool body 20 is moved in circle around the rotation axis Z in a direction reverse to that described above. Similarly to the demounting operation, an amount of circular movement is previously determined to be larger, by a proper amount, than that to threadedly mount the tool tip member 21 on the tool body 20.

The rotating member A may be provided with a plurality of the tip member holding means B so that the tool tip member can be changed automatically at a plurality of rotational positions during unattended operation.

In order to lock the tool tip member 21 described above in the tool tip member holding means B, in addition to the friction element, the tool tip member 21 is preferably provided with any engaging means suitable for tightening the tool tip member such as knurls, double-chamfered shape (i.e., a shape having two parallel chamfers) and the like. The combined use of the knurls and the friction element allows for more secure locking.

Figure 3A:
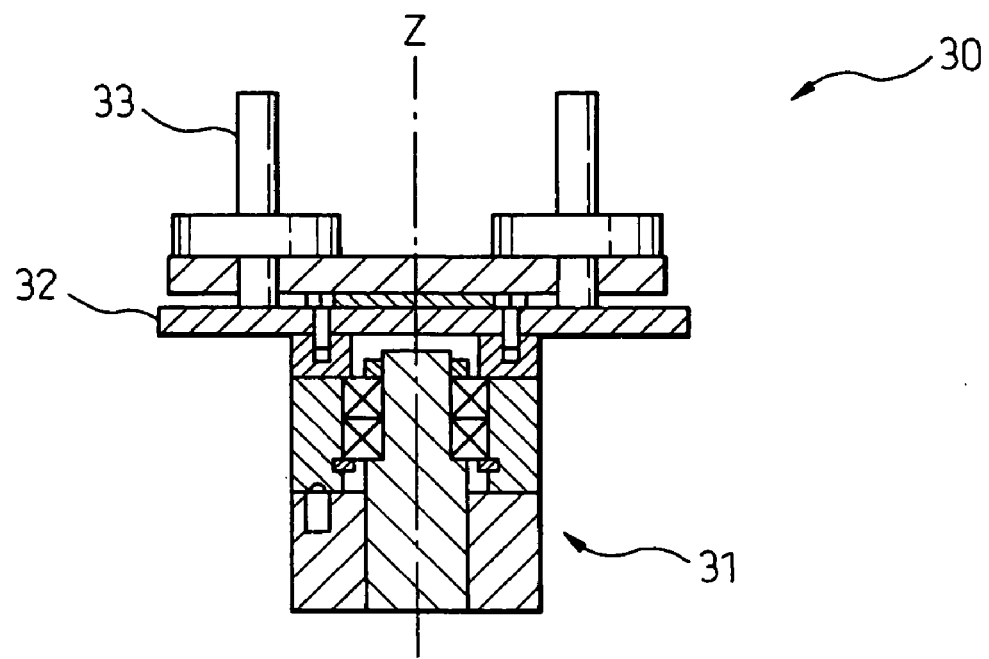
FIGS. 3A and 3B are a side cross-sectional view and a top view, respectively, showing an exemplary mechanism used in an apparatus for automatically changing a tool tip member to perform the demounting and mounting processes shown in FIGS. 2A and 2B, respectively.
Figure 3B:
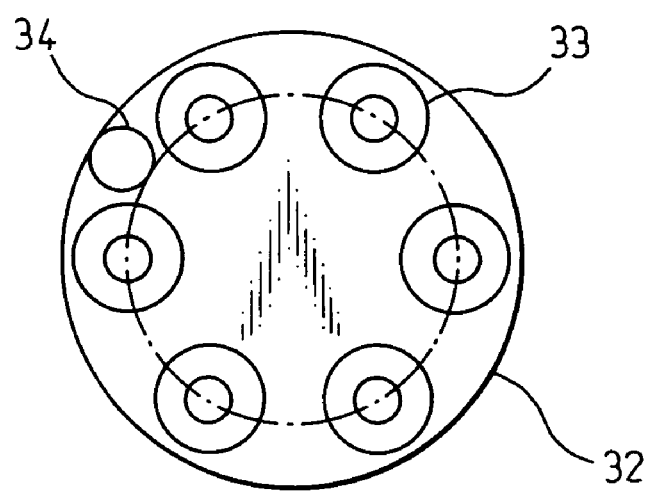

FIGS. 3A and 3B are a side cross-sectional view and a top view, respectively, showing an example of the tool tip member changing mechanism 30 used in the apparatus for automatically changing tool tip member to perform the demounting and mounting process in the procedure shown in FIGS. 2A and 2B. As shown in FIGS. 3A and 3B, the tool tip member changing mechanism 30 has a tip member changing jig, which has a base member (a pedestal) 31, a rotating member 32 supported on the base member 31 so as to rotatable about the rotation axis Z, and a plurality of (six in this embodiment) tip member holding means 33 disposed on the rotating member 32 at predetermined positions that are offset from the rotation axis Z of the rotating member 32 and along a circle centered on the rotation axis Z.

The rotating member 32 is an example of the rotating member A shown in FIGS. 2A and 2B, and the tip member holding means 33 is an example of the tip member holding means B shown in FIGS. 2A and 2B. The locating member 34 is also provided, which corresponds to the locating member C shown in FIGS. 2A and 2B. The procedure for demounting or mounting the tool tip member 21 from or on the tool body 20 by cooperation between the tool tip member changing mechanism and the robot mechanism 10 shown in FIGS. 3A and 3B is similar to that described above with reference to FIGS. 2A and 2B, and a description is omitted.

Figure 4:
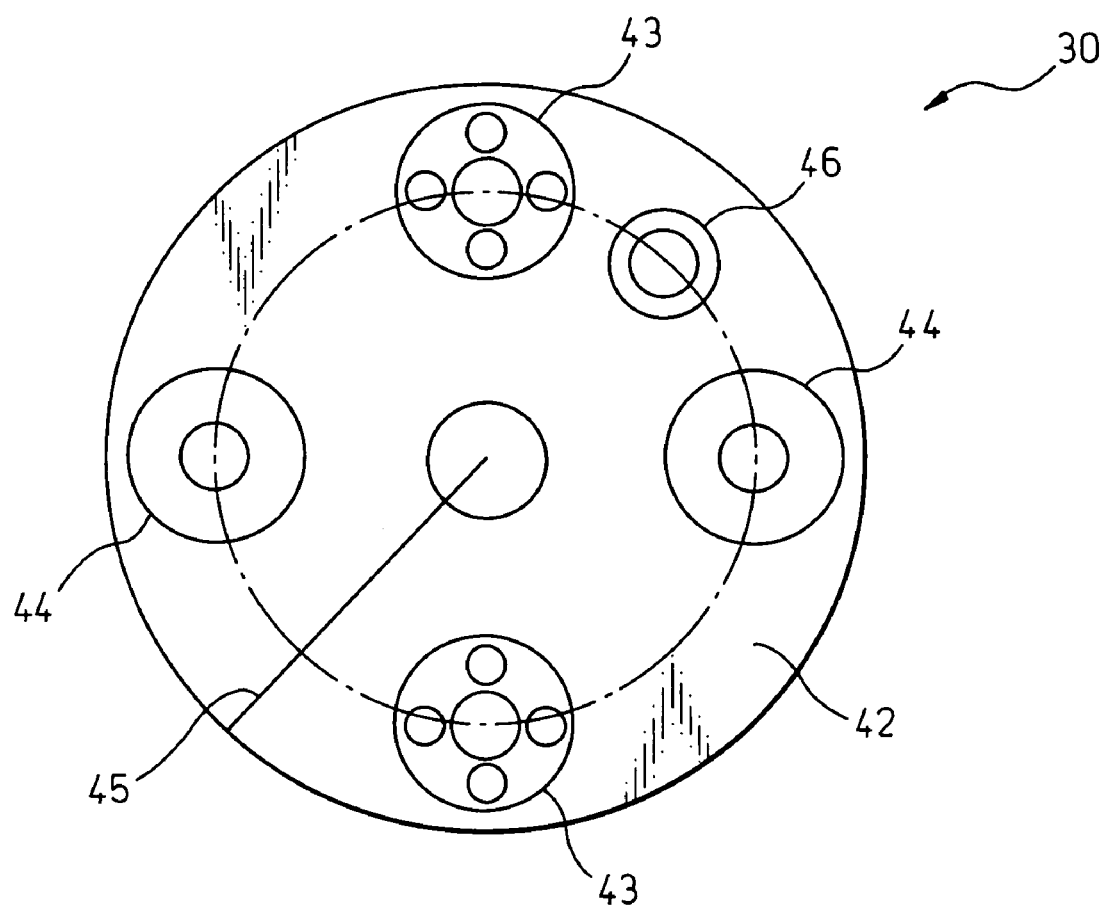
FIG. 4 is a top view showing a substantial part of a rotating member and tip member holding means in another exemplary mechanism used in the apparatus for automatically changing a tool tip member to perform the demounting and mounting processes shown in FIGS. 2A and 2B.

FIG. 4 is a top view showing an substantial part of a rotating member and a tip member holding means in another example of the tool tip member changing mechanism 30 used for demounting and mounting the tool tip member 21 shown in FIGS. 2A and 2B. Further, FIGS. 5A and 5B are a right side view and a cross-sectional view taken along the line VB—VB in FIG. 5A, respectively, of a tip member holding means for the demounting process that may be used as one of the tip member holding means in the tool tip member changing mechanism 30 shown in FIG. 4, and FIGS. 6A and 6B are a right side view and a cross-sectional view taken along the line VIB—VIB in FIG. 6A, respectively, of a tip member holding means for the mounting process that may be used as one of the tip member holding means in the tool tip member changing mechanism 30 shown in FIG. 4.

In the tool tip member changing mechanism 30 in this embodiment, the rotating member 42 corresponds to the rotating member A in FIGS. 2A and 2B, the tip member holding means 43 and 44 correspond to the tip member holding means B in FIGS. 2A and 2B, and the locating member 45 corresponds to the locating member C shown in FIGS. 2A and 2B. However, two types of tip member holding means including the tip member holding means 43 for the demounting process and the tip member holding means 44 for the mounting process are employed and each type is provided in pairs. Further, a nozzle cleaning means 46 is provided for cleaning an inner peripheral surface of a nozzle (a part of the tool body) provided on the welding torch in a manner described later.

Figure 5A:
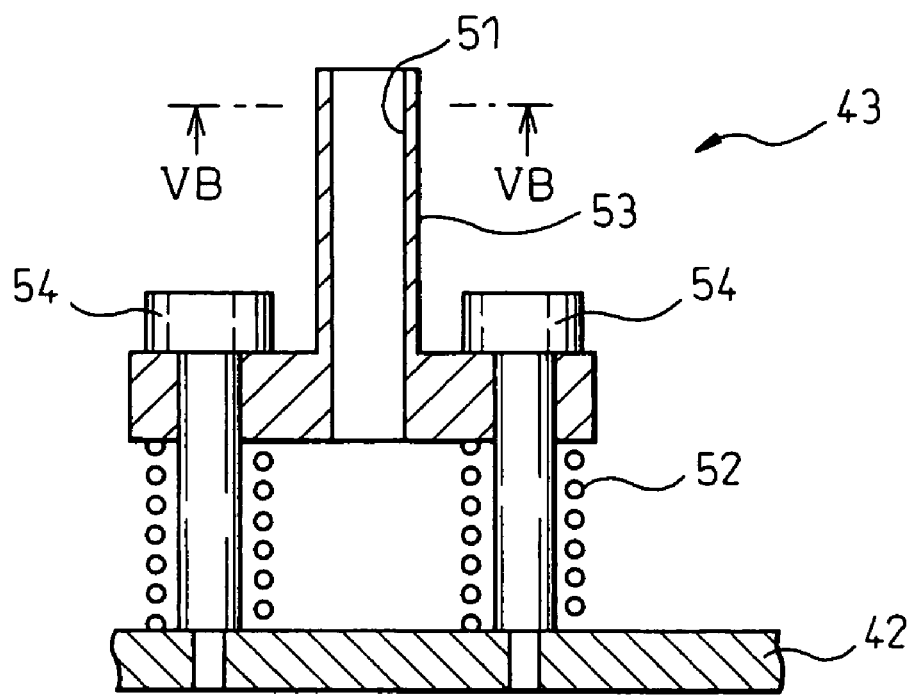
FIG. 5A is a right side view for illustrating a tip member holding means for the demounting process used in the mechanism shown in FIG. 4.
Figure 5B:
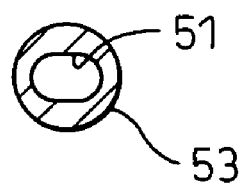
FIG. 5B is a cross-sectional view taken along the line VB—VB in FIG. 5A.

As shown in FIG. 5A, the tip member holding means 43 for the demounting process includes guide pins 54 standing vertically on the rotating member 42, a double-chamfered engaging member 53 that has a receiving hole 51 having a double-chamfered shape in cross section and that is movable along the guide pins 54, and compression springs 52 extending spirally around the guide pins 54 between the rotating member 42 and the double-chamfered engaging member 53. FIG. 5B is a top view of the double-chamfered engaging member 53 taken along the line VB—VB in FIG. 5A.

Figure 6A:
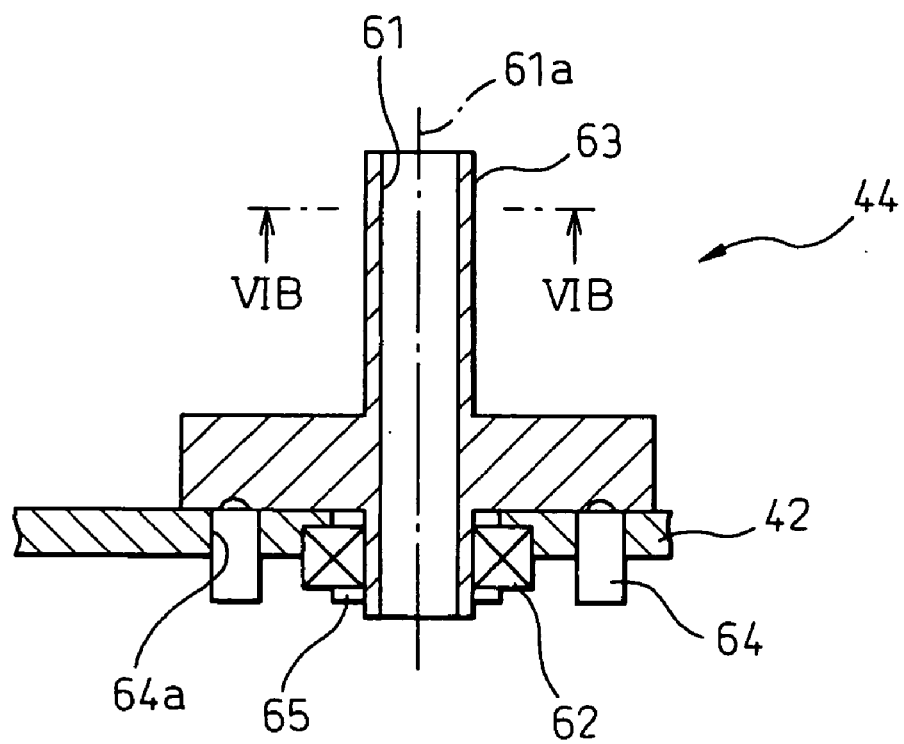
FIG. 6A is a right side view for illustrating a tip member holding means for the mounting process used in the mechanism shown in FIG. 4.
Figure 6B:
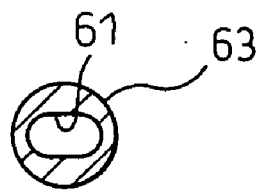
FIG. 6B is a cross-sectional view taken along the line VIB—VIB in FIG. 6A.

On the other hand, as shown in FIG. 6A, the tip member holding means 44 for the mounting process includes a double-chamfered engaging member (a tip member holding means) 63 that has a receiving hole 61 having a double-chamfered shape in cross section and that is supported on the rotating member 42 by means of a bearing 62 and a lock nut (a Fine U-Nut) 65 so as to be rotatable about a rotation axis 61a, and a plurality of (in this embodiment, four) ball spring plungers 64 spaced apart from each other on the rotating member 42 equiangularly along a circle centered on the rotation axis 61a. The balls of the ball spring plungers 64 can be engaged in a plurality of holes 64a that are formed on the bottom surface of the double-chamfered engaging member equiangularly along a circle centered on the rotation axis 61a so that the ball spring plungers form a clutch mechanism together with the holes 64a on the double-chamfered engaging member 63. FIG. 6B is a cross-sectional view of the double-chamfered engaging member 63 taken along the line VIB—VIB in FIG. 6A. The ball spring plungers described above may be replaced by pin-type spring plungers.

When a torque larger than a specific level is exerted on the double-chamfered engaging member 63 during the mounting of the tool tip member 21 on the tool body 20, the clutch mechanism formed as described above is activated so as to allow the double-chamfered engaging member 63 to rotate with respect to the rotating member 42 about the rotation axis 61a, thereby achieving the tightening of the tool tip member 21 with a specific level of torque.

When the tip member holding means 43 for the demounting process and the tip member holding means 44 for the mounting process are used, the procedure for demounting and mounting the tool tip member 21 is generally as follows. As the procedure for locating the rotating member 42 is similar to that described above except that the locating member 45 is used in place of the locating member C or 34 (in FIGS. 2A and 2B or in FIGS. 3A and 3B, respectively), a description of this procedure is omitted.

In the demounting and mounting process, in a manner similar to that in the example described above, the robot mechanism 10 recognizes a position of the rotating member 42 by utilizing the locating member 45 and then inserts the tool tip member 21 mounted on the tool body 20 into the receiving hole 51 of the double-chamfered engaging member 53 of one of the tip member holding means 43 for the demounting process. The tool tip member (the contact tip) 21 is mounted on the distal end of the welding torch corresponding to the tool body 20, and the double-chamfered cross-sectional shape of the tool tip member (the contact tip) 21 is suitable for tightening the tool tip member by the double-chamfered engaging member 53 (and 63). More specifically, as shown in FIG. 5A, a cylindrical end portion of the double-chamfered engaging member 53 of the tip member holding means 43 for the demounting process projects from a base portion of the double-chamfered engaging member 53 so that the tool tip member 21 is locked in the receiving hole 51 that is formed inside the cylindrical end portion and that has a cross-sectional shape substantially conforming to that of the tool tip member 21. Thus, the double-chamfered engaging member 53 functions as a rotation locking member.

When the tool tip member 21 is inserted into the receiving hole 51 of one of the tip member holding means 43 for the demounting process, the phase (the orientation about the axis) of the chamfers formed on the tool tip member 21 is of concern. On the other hand, as the phase of the chamfers generally varies depending the tool body 20, the robot mechanism 10 cannot know the particular phase of each chamber in advance. However, as the double-chamfered engaging member 53 in the tip member holding means 43 for the demounting process is supported on the rotating member 42 via the compression spring 52 (elastic body), it is possible to match the phase of the double chamfers of the tool tip member with the phase of the double-chamfered engaging member 53 by the robot arm of the robot mechanism 10 pressing the tool tip member 21 against the double-chamfered engaging member 53 with a specific force. More specifically, the robot mechanism 10 makes about one relative rotation, between the tool tip member 21 and the double-chamfered engaging member 53, by the operation of the robot arm with the center axis of the tool tip member 21 substantially aligned with that of the double-chamfered engaging member 53 of the tip member holding means 43 for the demounting process, while pressing the tool tip member 21 against the double-chamfered engaging member 53 of the tip member holding means 43 for the demounting process (by reaction force against the elastic force of the compression spring 52). When the phase of the tool tip member 21 matches to that of the receiving hole 51 of the double-chamfered engaging member 53 during this relative rotation, the robot arm inserts the tool tip member 21 into the receiving hole 51 up to a predetermined position and then demounts the tool tip member 21 from the tool body 20 by the circular movement thereof, as described above.

Servo control of the robot mechanism 10 may be utilized as an alternative means to the compression spring 52. In this case, the robot mechanism 10 makes about one relative rotation between the tool tip member 21 and the double chamfered engaging means 53 by the operation of the robot arm with the center axis of the tool tip member 21 substantially aligned with that of the tip member holding means for the demounting process, while pressing the tool tip member 21 against the double-chamfered engaging member of the tip member holding means for the demounting process. The robot mechanism 10 can press the tool tip member 21 softly with a specific pressing force or, more specifically, with a softness that is predetermined by a "flexible servo control" in the task coordinate system as if elastic bodies such as a compression spring were provided between the tool tip member 21 and the double-chamfered engaging member of the tip member holding means in order to prevent an excessively large pressing force from being generated between the tool tip member 21 and the tip member holding means for the demounting process. The "flexible servo control" is a well-known art and is not described in detail here (see, for example, Japanese Unexamined Patent Publication (Kokai) Nos. 07-20941 and 08-227320).

Similarly in this technique, when the phase of the chamfers of the tool tip members 21 matches to that of the chamfers of the receiving hole 51 during the relative rotation between the tool tip member 21 and the double-chamfered engaging member 53, the tool tip member 21 is fitted into the receiving hole 51 of the tip member holding means for the demounting process, and the robot arm inserts the tool tip member 21 into the receiving hole 51 up to the predetermined position and then demounts the tool tip member 21 from the tool body 20 by the circular movement thereof as described above.

Next, the process for mounting the tool tip member 21 on the tool body 20 will be described briefly. As described above with reference to FIGS. 6A and 6B, the tip member holding means 44 for the mounting process is provided with the rotating mechanism using the bearing 62 and the clutch mechanism using the ball spring plungers. When a torque larger than a specific level is exerted on the double-chamfered engaging member 63 (that functions as a rotation locking member in a manner similar to the double-chamfered engaging member 53) during the mounting of the tool tip member 21 on the tool body 20, the clutch mechanism is activated so as to allow the double-chamfered engaging member 63 to rotate with respect to the rotating member 42 about the rotation axis 61a, thereby achieving the tightening of the tool tip member 21 with the specific level of torque.

In the mounting process, the rotating member 42 is located using the locating member 45 just as in the demounting process, and the tool body 20 is then moved to a position directly above one of the tip member holding means 44 for the mounting process holding respective tool tip members (contact tips) 21. Then, the robot arm descends by a predetermined distance and then threadedly mounts the tool tip member 21 by the circular movement thereof. It should be noted that the direction of the circular movement is reverse to that in the threadedly disengaging (demounting) operation. An amount of circular movement is determined to be somewhat larger than that required for the threadedly mounting. Further, if the torque is increased abruptly after the threadedly mounting is substantially completed, the clutch mechanism allow the double-chamfered engaging member 63 to rotate thereby to prevent excessively large load on each part from being generated.

Also in this mounting process, servo control of the robot mechanism 10 may be employed as an alternative means. In this case, the robot mechanism 10 measures disturbance torques acting on each of control axes and stops rotation when each of the disturbance torques reaches a predetermined value, so that the tool tip member 21 can be tightened to the tool body 20 with a specific tightening torque. The technique for stopping the operation of the robot arm when the disturbance torque reaches a predetermined value is well-known and is not described in detail here (see, for example, Japanese Unexamined Patent Publication (Kokai) Nos. 06-170540 and 2002-283059).

Next, with reference to FIG. 7, the nozzle cleaning means 46 shown in FIG. 4 will be described.

The nozzle cleaning means 46 is an example of tool cleaning means for cleaning the tool tip member 21 or the nozzle 22 mounted on the tool body 20 and is disposed on the rotating member 42 of the tip member changing jig. The nozzle 22 is a kind of the tool tip member and is attached to the outside of the tool tip member 21 described above so as to encircle the tool tip member 21 with a gap.

The nozzle cleaning means 46 has a structure in which a cleaning brush 47 is attached to the outer peripheral surface of a body comprised of a cylindrical member 47a. In use, based on the result of the locating described above, the robot mechanism 10 operates to move the tool body 20 to a position directly above the nozzle cleaning means 46 and then to descend by a predetermined distance. After that, it is in the state as shown in FIG. 7. More specifically, there is a gap 23 between the nozzle 22 provided at the distal end of the tool body (the welding torch) 20 and the tool tip member (the contact tip) 21 attached to the tool body 20 to allow an assist gas to flow, and the cylindrical member 47a and the brush 47 are inserted into such gap 23.

The cylindrical member 47a and the brush 47 are sized so that the brush 47 comes into appropriate contact with the inner peripheral surface of the nozzle 22.

Figure 7:
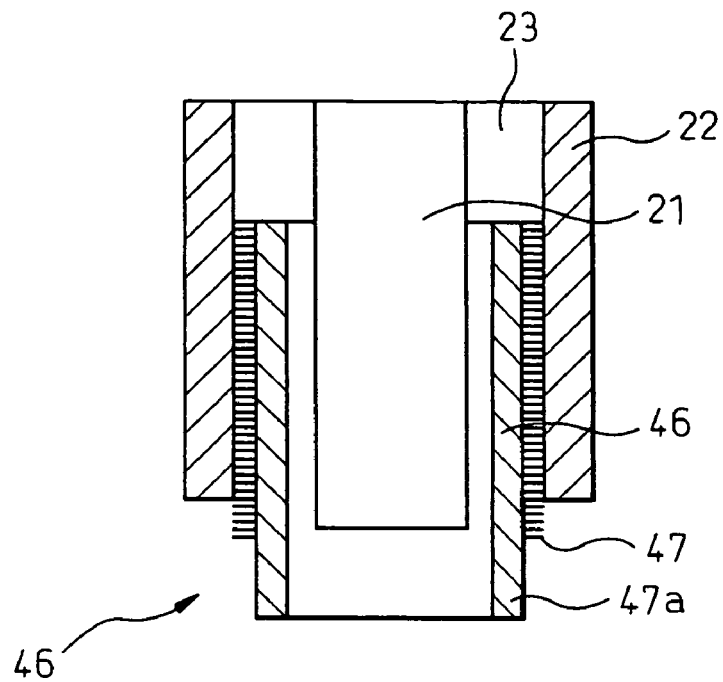
FIG. 7 is a cross-sectional view of a tool cleaning means provided on a rotating member of a tip member changing jig.
Figure 8:
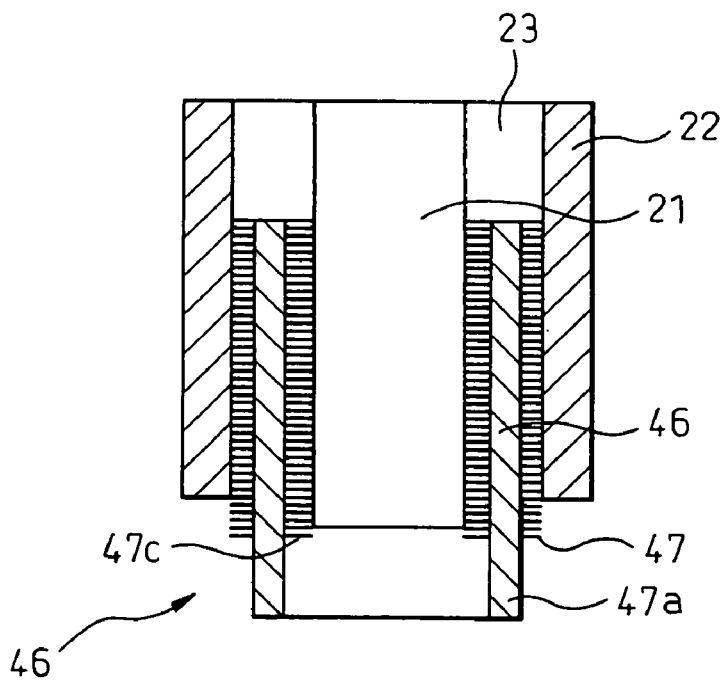
FIG. 8 is a cross-sectional view of another embodiment of the tool cleaning means.

In the state as shown in FIG. 7, if the robot mechanism 10 operates to rotate the rotating member 42 in a manner similar to that in the operation for demounting the tool tip member 21 as described above, the brush 47 rubs the inner peripheral surface of the nozzle 22 so that an arc discharge due to such rubbing removes substances deposited as spatters on the inner peripheral surface of the nozzle 22. As shown in FIG. 8, by further providing a brush 47c on the inner peripheral surface of the cylindrical member 47a, the tool tip member (the contact tip) 21 may also be cleaned. Means other than the brush 47, such as a reamer and the like, may also be used if it is effective to remove the spatter deposits.

Moreover, a rotating member dedicated to the nozzle cleaning means as well as a pedestal for rotatably supporting the rotating member may be provided besides the tip member changing jig so that the nozzle cleaning is performed at a different position from where the tool tip member is changed in order to facilitate removal of fallen spatter. Preferably, because it is desirable to remove the spatters from the inner peripheral surface of the nozzle 22 before changing the tool tip member 21, the nozzle cleaning as described above is typically performed before changing the tool tip member.

Figure 9A:
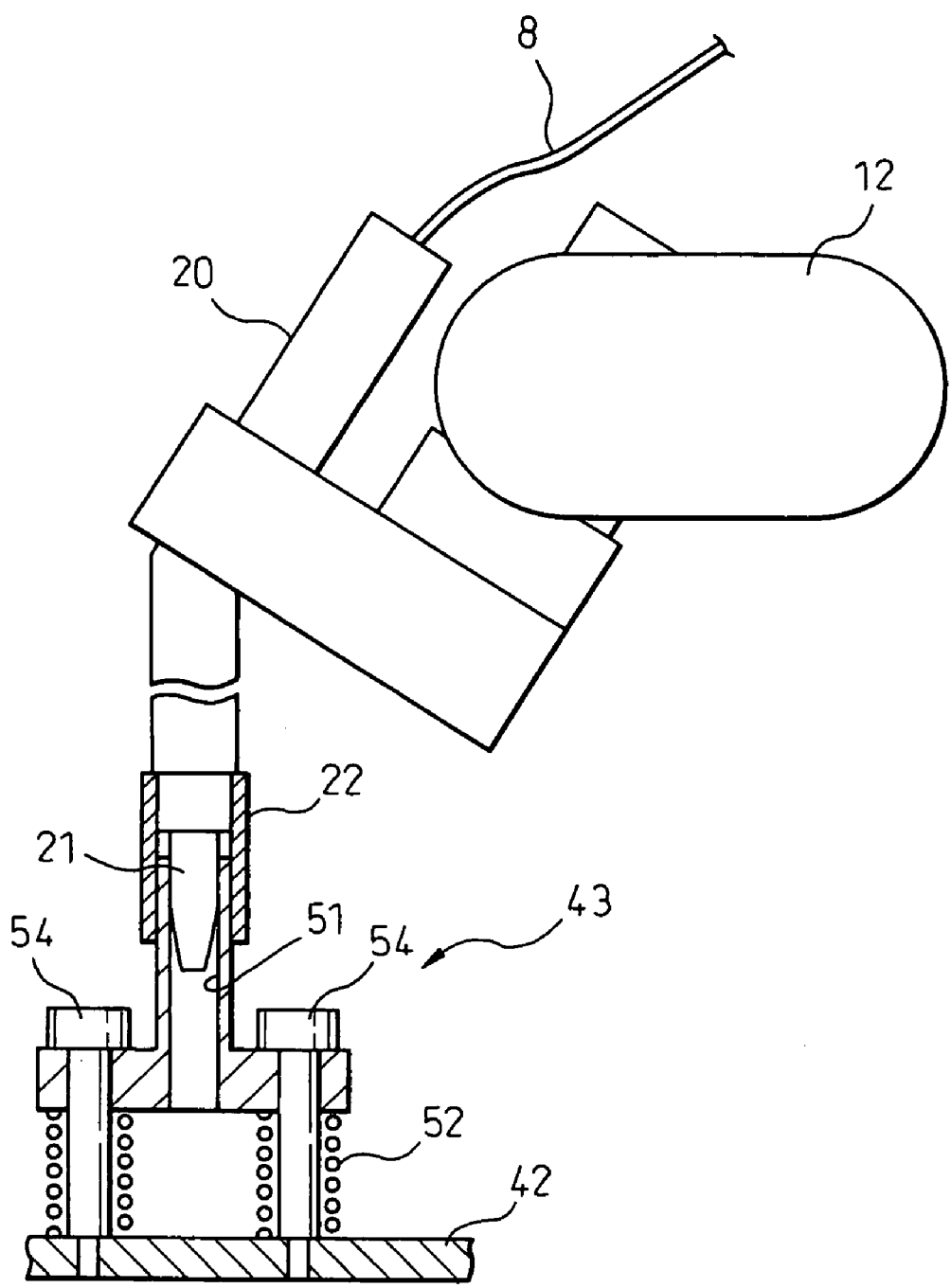
Figure 9B:
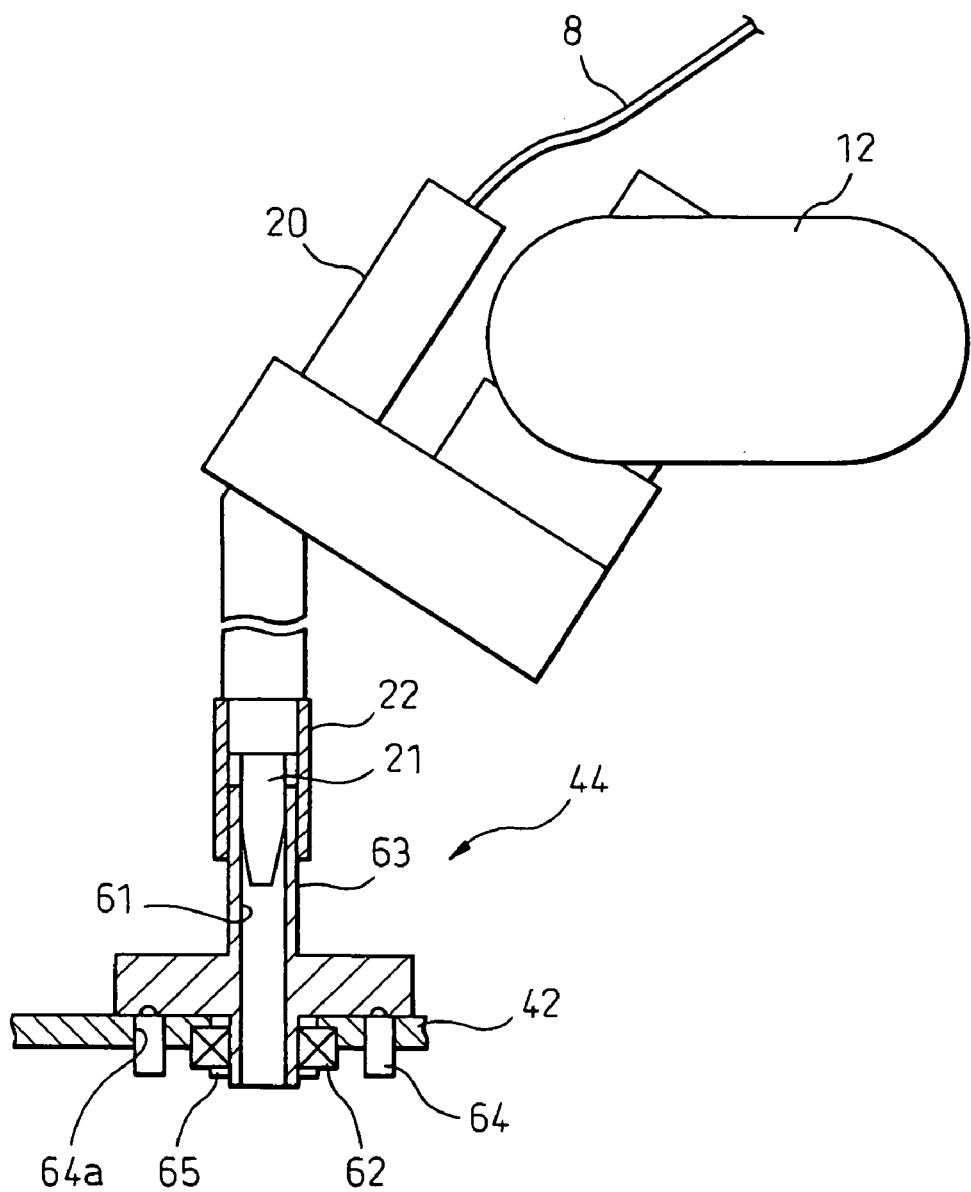

As described above, if the nozzle 22 is disposed around the tool tip member 21, as shown in FIGS. 9A and 9B, the outer diameter of the cylindrical end portion of the double-chamfered engaging member of the tip member holding means should be sized to be smaller than the inner diameter of the nozzle 22. This allows the cylindrical end portion of the double-chamfered engaging member to be inserted into the gap between the inner peripheral surface of the nozzle 22 and the outer peripheral surface of the tool tip member 21, so that the tool tip member 21 can be changed without demounting the nozzle 22 from the tool body 20, just as in the case when the inner peripheral surface of the nozzle 22 is cleaned. It should be noted that parts in common with FIGS. 1A–8 are referred to by like reference numerals in FIGS. 9A and 9B. These parts are similar to those described above and are not described in detail here.

While the present invention has been described with reference to the embodiments shown in the accompanying drawings, it is to be understood that these embodiments are only illustrative and not restrictive. Therefore, the scope of the present invention is defined by the appended claims and the embodiments of the present invention may be modified or changed without departing from the scope of the appended claims.

What is claimed is:

1. An apparatus for automatically changing a tool tip member for a robot, said robot operating in the condition that said tool tip member is threadedly mounted on a tool body mounted on a robot arm, said apparatus comprising:
   a tip member changing jig disposed in an operational area of said robot;
   a controller for controlling operation of said robot;
   said tip member changing jig including a base member, a rotating member rotatably supported by said base member about a rotation axis, and tip member holding means for holding said tip member and disposed at a position that is offset from said rotation axis of said rotating member; and
   said tip member holding means adapted to hold said tool tip member so that a central axis of relative rotation, for threadedly mounting the tool tip member on said tool body, extends substantially parallel to said rotation axis and rotation of said tool tip member, with respect to said rotating member, is locked;
   wherein said tip member holding means has a rotation locking member for locking the relative rotation of said tool tip member with respect to said tip member holding means and said rotation locking member is supported on said rotating member via elastic element.

2. The apparatus according to claim 1, wherein said rotation locking member is supported on said rotating member so as to allow said rotation locking member to rotate about its axis when a torque larger than a predetermined value is exerted on said rotation locking member in the rotation direction.

3. The apparatus according to claim 1, wherein said rotation locking member includes a cylindrical portion formed with a receiving hole for receiving said tool tip member, so that said tool tip member is demounted or mounted from or on said tool body while said tool tip member being inserted into said receiving hole.

4. The apparatus according to claim 3, wherein a cylindrical outer tool tip member is further attached to said tool body so as to encircle the periphery of said tool tip member with a gap, and wherein an outer diameter of the cylindrical portion of said rotation locking member is smaller than an inner diameter of said outer tool tip member so that the inner tool tip member disposed inside said outer tool tip member can be changed while said outside tool tip member being mounted on said tool body.

5. The apparatus according to claim 4, wherein said rotating member is provided with tool cleaning means for cleaning both or either one of said inner tool tip member and said outer tool tip member.

6. The robot tool tip member automatic changing apparatus according to claim 5, wherein said tool cleaning means includes a cylindrical element and said controller controls the operation of said robot arm to move said tool body around said rotation axis with said cylindrical element inserted between said outside tool tip member and said inside tool tip member, thereby to bring about relative rotation between said cylindrical element of said tool cleaning means and said inner and outer tool tip members so as to clean both or either one of said inner tool tip member and said outer tool tip member.

7. The apparatus according to claim 6, wherein said robot comprises an arc welding robot, said tool body comprises an arc torch provided with a nozzle as said outer tool tip member, said inner tool tip member comprises a contact tip, and said tool cleaning means comprises nozzle cleaning means.

* * * * *